Feb. 20, 1923.
M. O. REEVES
V-TYPE BELT
Filed May 22, 1922 — 2 sheets-sheet 1
1,446,017
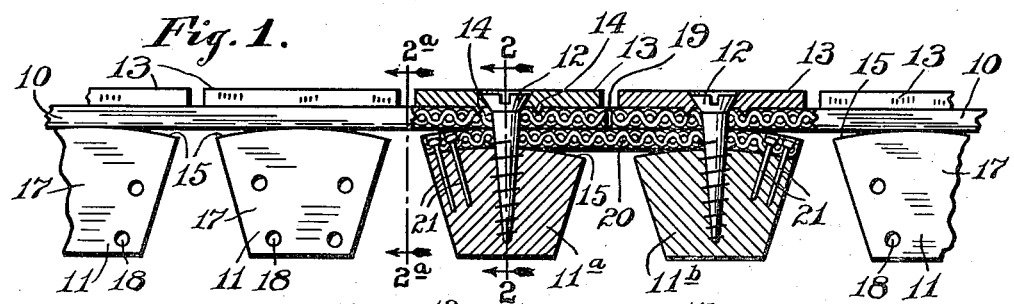
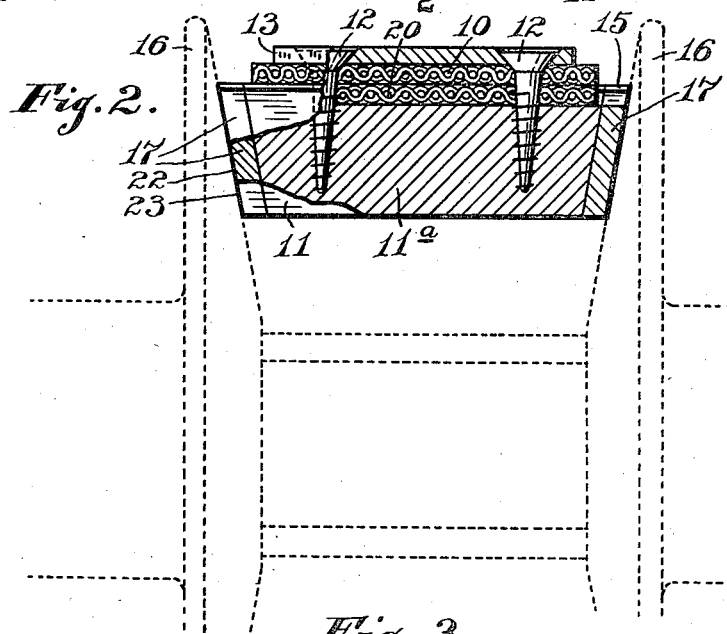
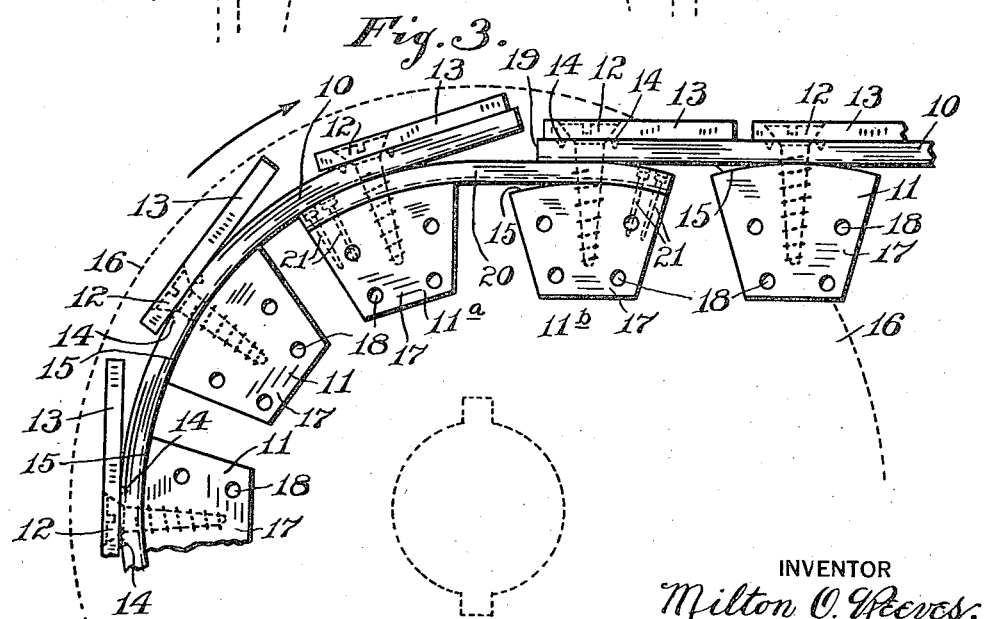
INVENTOR
Milton O. Reeves,
BY
ATTORNEY Feb. 20, 1923.
M. O. REEVES
V-TYPE BELT
Filed May 22, 1922
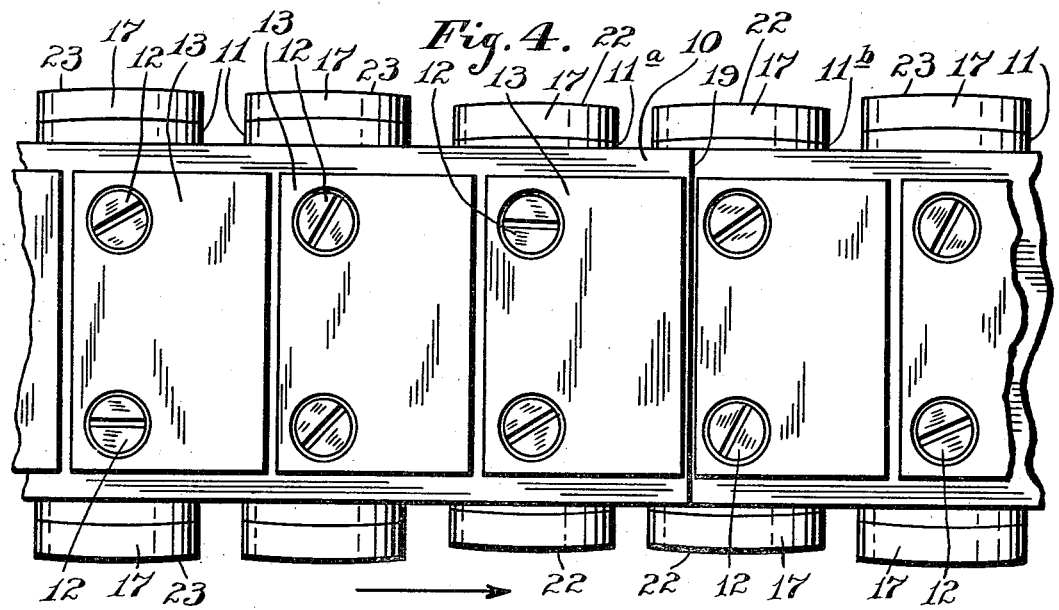
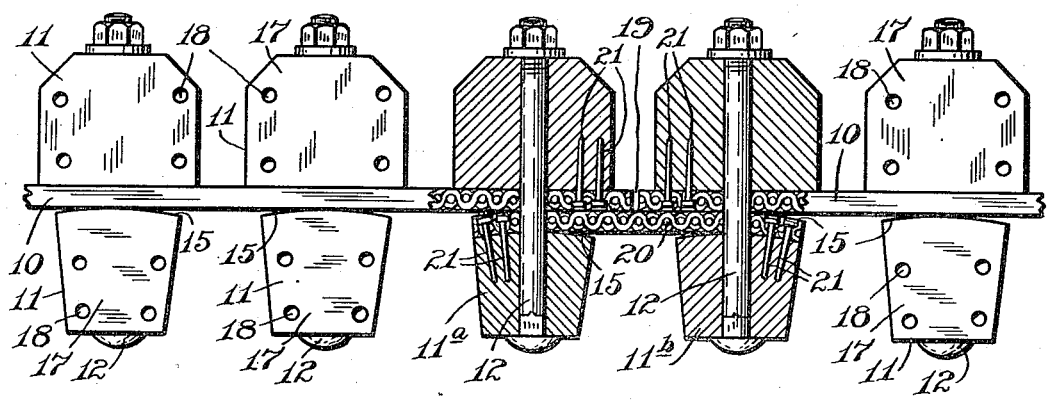
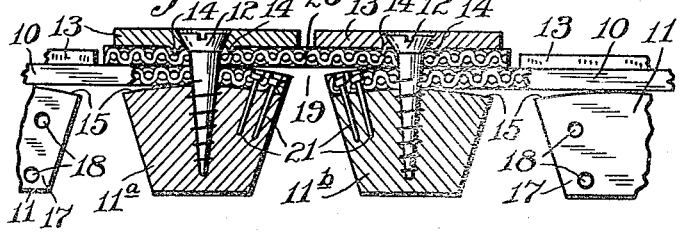
INVENTOR
Milton O. Reeves,
BY
ATTORNEY Patented Feb. 20, 1923.

1,446,017

UNITED STATES PATENT OFFICE.

MILTON O. REEVES, OF COLUMBUS, INDIANA, ASSIGNOR TO REEVES PULLEY CO., OF COLUMBUS, INDIANA, A CORPORATION OF INDIANA.

V-TYPE BELT.

Application filed May 22, 1922. Serial No. 562,646.

*To all whom it may concern:*

Be it known that I, MILTON O. REEVES, a citizen of the United States, residing at Columbus, in the county of Bartholomew and State of Indiana, have invented a new and useful V-Type Belt, of which the following is a specification.

It is the main object of my invention to provide in a V-type cross-bar belt a joint which will have the same strength and the same flexibility as the remainder of the belt and which will not interfere with the frictional contact of the ends of any of the cross-bars with the tapered flanges of the associated pulleys.

In attaining this object, I overlap one layer of the belt material upon another over a cross-bar, and fasten both layers of the belt material to such cross-bar, but not to each other save substantially at their line of fastening to such cross-bar, so that they are free to bend independently; and I make the cross-bar at the double thickness of belt material of such length at the top with respect to the neighboring cross-bars which lie below only a single thickness of the belt material that the oblique ends of all the cross-bars will lie in substantially the same plane. In the preferred form of my invention, claimed here specifically, I make the joint over two adjacent cross-bars, each of which has two thicknesses of belt material over it, one of such thicknesses being merely an overlap piece extending over said two cross-bars, while the other thickness is formed by one of the two ends of the main strip of belt material which abut against each other between their lines of attachment to said cross-bars and both overlap said overlap piece.

In my co-pending application, Serial No. 562,647 of even filing date herewith, I claim another specific embodiment of the same broad invention, but the generic claims are in the present case.

Other features of my invention will appear hereinafter.

The accompanying drawings illustrate my invention: Fig. 1 is a side elevation of a straight portion of a belt embodying my invention, partially in section on a line of attaching screws; Fig. 2 is a section on the line 2—2 of Fig. 1, partly broken away back to the line 2ª—2ª of Fig. 1, with a fragment of an associated taper-flange pulley shown in dotted lines; Fig. 3 is a side elevation of a fragment of a belt embodying a modified form of my invention, shown partly in position around a pulley; Fig. 4 is a plan of a straight portion of the belt shown in Fig. 3; Fig. 5 is a fragmental side elevation of a form of my invention in which cross-bars are used on both the inside and outside of the belt; and Fig. 6 is a view similar to Fig. 1, but with the joint strip on the outside instead of on the inside.

The belt consists fundamentally of a strip of belt material 10, such as leather or woven fabric, attached to a series of spaced cross-bars 11, which may be all on one side of the belt (the inside as shown) as shown in Figs. 1, 2, 3, 4, and 6, or may be in pairs on opposite sides of the belt as shown in Fig. 5. The double-bar arrangement shown in Fig. 5 is an obvious modification, and for simplicity it will in general be sufficient to describe the single-bar arrangement shown in the other figures.

The belt material 10 is fastened to the cross-bars 11 by screws or bolts 12, which as shown are wood screws in Figs. 1, 2, 3, 4, and 6, and bolts in Fig. 5. In the single-bar arrangements of Figs. 1 to 4 inclusive and 6 there are clamping plates 13 on the opposite side of the belt material 10 from the cross-bars 11, and in the double-bar arrangement of Fig. 5 the outer cross-bars serve as and take the place of such clamping plates in addition to their other functions. In order to ease the strain on the screws 12 and on the belt material 10 at the holes for such screws, I provide the belt-engaging faces of the clamping plates 13 with belt-gripping points 14 which bite into the surface of the belt material 10; these are especially desirable at the cross-bars beneath two thicknesses of belt material, hereinafter particularly referred to. These points are preferably located only close to the line of the two or more screws 12 which fasten each cross-bar 11 to the belt material 10, as is clear from Fig. 1, as only there do the plates 13 remain constantly in contact with such belt-material. The outer surfaces 15 of the cross-bars 11 (or of the inner cross-bars in the double-bar arrangement of Fig. 5) are preferably curved, to form segments of cylinders, of sufficiently small radius to correspond with the minimum radius of curvature the belt will have in its operation. The belt material 10 swings into and out of contact with the outer parts of such curved surfaces 15, and the inner faces of the outer cross-bars in the double-bar arrangement of Fig. 5, as the belt passes from a straight line into a curved line and vice versa.

The clamping plates 13 may be symmetrical with respect to the line of screws 12 on each cross-bar, as is shown in Figs. 1 and 6, as is especially suitable for belts in which the direction of travel is reversible; or they may be unsymmetrical with respect to such line, with their projecting edges in advance, as is shown in Figs. 3 and 4, as is suitable for belts which travel only in one direction, so that such projecting edges of the clamping plates will serve to prevent reverse bending of the belt as it is pulled out from between the taper flanges 16 of the pulley. This latter arrangement of clamping plates is specifically claimed per se in my co-pending application Serial No. 526,573, filed Jan. 3, 1922.

The taper flanges 16 of the pulley are engaged by the ends of the cross-bars 11. Such ends are therefore tapered to correspond to the taper of such flanges, as is clear from Fig. 2; so that by moving the flanges toward or from each other the belt is pushed radially outward or allowed to come radially inward on the pulley, thus varying the effective diameter of the pulley. For getting a proper frictional grip on the pulley flanges, I preferably provide the ends of the cross-bars 11 with frictional faces 17, preferably made of leather held on by tacks 18 as well as by being glued.

To make a joint in this belt, it is desirable that the belt at the joint be of the same strength and flexibility as the remainder of the belt, and that the engagement of the ends 17 of the cross-bars 11 with the pulley flanges 16 be not interfered with. In the specific embodiments of my invention here shown, I bring the two ends to be joined of the strip of belt material together or nearly together in the same plane, without overlapping them, so that they are separated from each other on the line 19. This line 19 is between the lines of screw attachment of such belt material to two adjacent cross-bars 11$^a$ and 11$^b$; and is preferably in the space between the adjacent edges of the cross-members—clamping plates 13 or cross-bars 11—which the end portions of the main strip directly engage, whether the clamping plates are symmetrical or unsymmetrical with respect to such screw-attachment lines. A supplemental strip or joint strip 20 of belt material, preferably of the same belt material as the strip 10, is placed against one face of the strip 10 to overlap the joint line 19, and to extend across the two adjacent cross-bars 11$^a$ and 11$^b$. This joint strip 20 lies on the inner face of the main strip in the arrangements shown in Figs. 1 to 5 inclusive, and on the outer face thereof in the arrangement shown in Fig. 6; I prefer the former arrangement, with the joint strip 20 on the inside. This joint strip 20 is clamped to such cross-bars 11$^a$ and 11$^b$ by the same screws or bolts 12 which clamp in place the main belt strip 10 and the respective clamping plates 13. In addition, each free strip-end-portion which directly engages a cross-bar, whether of the main strip or the joint strip, is preferably attached to that cross-bar by tacks 21 between the end of the strip and the line of screw attachment to that cross-bar. This is shown for the end portions of the joint strip in Figs. 1 and 3, for the end portions of the main strip in Fig. 6, and for the end portions of both the main strip and the joint strip in Fig. 5. This keeps such free end-portions from bending in operation, so that as the belt travels, the joint-strip 20 between its lines of screw attachment to its two associated cross-bars, and the main strip on the other sides of such lines of screw attachment, are respectively free to bend along and to swing into and out of engagement with the curved surfaces of the inward adjacent members; which are the cross-bars 11$^a$ and 11$^b$ in Figs. 1 to 5 inclusive and are the end portions of the main strip 10 in Fig. 6. Thus the belt at the joint, and between each cross-bar 11$^a$ and 11$^b$ and each adjacent cross-bar, has both the strength and the flexibility of only a single thickness of belt material, the same as between any other two adjacent cross-bars, for between each of such cross-bars and each of its neighbors there is a connection by only a single layer of belt material, and only that layer of belt material bends in the operation of the belt.

In order that all the cross-bars of the belt may be in proper frictional engagement with the flanges 16, it is essential that their oblique ends all lie in substantially the same plane when the belt is straight, or on the surface of the same cone when the belt is curved. This can be done in the arrangement shown in Fig. 6, where the joint strip is on the outside and is not interposed between the main strip and any cross-bars, by making all the cross-bars of the same dimensions. In the arrangements shown in the other figures, however, if the cross-bars 11$^a$ and 11$^b$ were of the same dimensions throughout as their adjacent cross-bars, the off-setting due to the interposition of the joint strip 20 between such cross-bars 11$^a$ and 11$^b$ and the belt strip 10 would mean the lifting of the adjacent cross-bars 11 out of engagement with the flanges 16, or at least a tendency to produce such lifting and a resultant necessity for a greater bending of the belt to obtain such engagement. Therefore, in the arrangements of Figs. 1 to 5 inclusive, in order that all the cross-bars of the belt may be in proper frictional engagement with the flanges 16, I make the cross-bars 11$^a$ and 11$^b$ which are below the joint strip 20 shorter (transversely of the belt) at their outer surfaces than are the adjacent cross-bars; so that such cross-bars 11$^a$ and 11$^b$ will have their outer surfaces farther down on the taper flanges 16 of the pulley than are those of the adjacent cross-bars, and the frictional surfaces 22 on the ends of the cross-bars 11$^a$ and 11$^b$ will be in the same plane when the belt is straight, and on the surface of the same cone when the belt is curved, as are the frictional surfaces 23 on the ends of the adjacent cross-bars 11. This is clear from Figs. 1, 2, and 4; the cross-bar 11$^a$ in Fig. 2 being partly broken away at one end to show the adjacent cross-bar 11 behind it, with the frictional surfaces of such two cross-bars in the same plane.

Thus in all the arrangements shown, the joint is made without interfering with the proper frictional engagement of the ends of all the cross-bars with the pulley flanges, and without requiring any greater bending of the belt at one point than at another, while still maintaining the belt of uniform strength and uniform flexibility throughout its length.

I claim as my invention:

1. A V-type cross-bar belt, comprising a strip of belt material having its ends coming close together without overlapping, a plurality of cross-bars attached to said strip at spaced points along it, and a joint strip of belt material overlapping the line of separation between the ends of said first strip and the two cross-bars adjacent to such line of separation, said joint strip being attached to said last-named two cross-bars and being interposed between the first strip and said two cross-bars so that at such two cross-bars there is a double thickness of belt material, said cross-bars having oblique ends which all lie in substantially the same plane when the belt is straight.

2. A V-type cross-bar belt, comprising a strip of belt material having its ends coming close together without overlapping, a plurality of cross-bars attached to said strip at spaced points along it, and a joint strip of belt material overlapping the line of separation between the ends of said first strip and the two cross-bars adjacent to such line of separation, said joint strip being attached to said last-named two cross-bars so that at such two cross-bars there is a double thickness of belt material, said cross-bars having oblique ends which all lie in substantially the same plane when the belt is straight.

3. A V-type cross-bar belt, comprising a strip of belt material having its ends coming close together without overlapping, a plurality of cross-bars attached to said strip at spaced points along it, and a joint strip of belt material overlapping the line of separation between the ends of said first strip and the two cross-bars adjacent to such line of separation, said joint strip being attached to said last-named two cross-bars and being interposed between the first strip and said two cross-bars so that at such two cross-bars there is a double thickness of belt material, said cross-bars having oblique ends, and the two cross-bars which are overlapped by said joint strip being of different lengths on their strip-engaging faces than are the other cross-bars, the difference in length being sufficient so that the oblique ends of all the cross-bars lie in substantially the same plane when the belt is straight.

4. A V-type cross-bar belt, comprising a strip of belt material having its ends coming close together without overlapping, a plurality of cross-bars attached to said strip at spaced points along it, and a joint strip of belt material overlapping the line of separation between the ends of said first strip and the two cross-bars adjacent to such line of separation, said joint strip being attached to said last-named two cross-bars and being interposed between the first strip and said two cross-bars so that at such two cross-bars there is a double thickness of belt material, said cross-bars having oblique ends which all lie in substantially the same plane when the belt is straight, the strip-engaging faces of said cross-bars being curved, and each end portion of said joint strip being attached to its associated cross-bar between the end of said joint strip and the middle of said curved face so that it permanently lies against that part of said curved face.

5. A V-type cross-bar belt, comprising a strip of belt material having its ends coming close together without overlapping, a plurality of cross-bars attached to said strip at spaced points along it, and a joint strip of belt material overlapping the line of separation between the ends of said first strip and the two cross-bars adjacent to such line of separation, said joint strip being attached to said last-named two cross-bars so that at such two cross-bars there is a double thickness of belt material, said cross-bars having oblique ends which all lie in substantially the same plane when the belt is straight, the strip-engaging faces of said cross-bars being curved, and each end portion of the strip engaging the two cross-bars closest to such line of separation being attached to its associated cross-bar between the end of said strip and the middle of said curved face so that it permanently lies against that part of said curved face.

6. A V-type cross-bar belt, comprising a strip of belt material having its ends coming close together without overlapping, a plurality of cross-bars attached to said strip at spaced points along it, and a joint strip of belt material overlapping the line of separation between the ends of said first strip and the two cross-bars adjacent to such line of separation, said joint strip being attached to said last-named two cross-bars so that at such two cross-bars there is a double thickness of belt material, said cross-bars having oblique ends which all lie in substantially the same plane when the belt is straight, each end portion of the strip engaging the two cross-bars closest to such line of separation being attached to its associated cross-bar between the end of said strip and the middle of the face against which it bears so that it permanently lies against that part of said face.

7. A V-type cross-bar belt, comprising a strip of belt material having its ends coming close together without overlapping, a plurality of cross-bars attached to said strip at spaced points along it, a joint strip of belt material, said cross-bars having oblique tion between the ends of said first strip and the two cross-bars adjacent to such line of separation, said joint strip being attached to said last named two cross-bars so that at such two cross-bars there is a double thickness of belt material, said cross-bars having oblique ends which all lie in substantially the same plane when the belt is straight, and a clamping plate associated with each of the two cross-bars to which said joint strip is attached, each of said two cross-bars and its associated clamping plate lying on opposite sides of the two thicknesses of belt material at said cross-bar so that said two thicknesses of belt material are clamped between said cross-bar and its associated clamping plate.

8. A V-type cross-bar belt, comprising a strip of belt material having its ends coming close together without overlapping, a plurality of cross-bars attached to said strip at spaced points along it, a joint strip of belt material overlapping the line of separation between the ends of said first strip and the two cross-bars adjacent to such line of separation, said joint strip being attached to said last-named two cross-bars so that at such two cross-bars there is a double thickness of belt material, said cross-bars having oblique ends which all lie in substantially the same plane when the belt is straight, and a clamping plate associated with each of the two cross-bars to which said joint strip is attached, each of said two cross-bars and its associated clamping plate lying on opposite sides of the two thicknesses of belt material at said cross-bar so that said two thicknesses of belt material are clamped between said cross-bar and its associated clamping plate, said clamping plates being provided with projecting points for penetrating the belt material which they engage.

9. A V-type cross-bar belt, comprising a plurality of spaced cross-bars having oblique ends, and belt material interconnecting said cross-bars, one of said cross-bars having two overlapping end portions of belt material superposed upon it while a next adjacent cross-bar has upon it the continuation of but one of said end portions, said two adjacent cross-bars being of different lengths on their strip-engaging surfaces by a sufficient amount so that the oblique ends of the two cross-bars lie in substantially the same plane when the belt is straight.

10. A V-type cross-bar belt, comprising a plurality of spaced cross-bars having oblique ends, and belt material interconnecting said cross-bars, one of said cross-bars having two overlapping end portions of belt material superposed upon it while a next adjacent cross-bar has upon it the continuation of but one of said end portions, said two adjacent cross-bars being so proportioned that their corresponding oblique ends lie in substantially the same plane when the belt is straight.

11. A V-type cross-bar belt, comprising a plurality of spaced cross-bars having oblique ends, and belt material interconnecting said cross-bars, one of said cross-bars having two overlapping end portions of belt material superposed upon it while the next adjacent cross-bar has upon it the continuation of but one of said end portions, said two adjacent cross-bars being so proportioned that their corresponding oblique ends lie in substantially the same plane when the belt is straight, the end portion which overlies said first cross-bar but does not extend to the second cross-bar being interposed between said first cross-bar and the other end portion.

12. A V-type cross-bar belt, comprising a plurality of spaced cross-bars having oblique ends, and belt material interconnecting said cross-bars, one of said cross-bars having two overlapping end portions of belt material superposed upon it while the next adjacent cross-bar has upon it the continuation of but one of said end portions, said two adjacent cross-bars being so proportioned that their corresponding oblique ends lie in substantially the same plane when the belt is straight, the end portion which overlies said first cross-bar but does not extend to the second cross-bar being interposed between said first cross-bar and the other end portion and being permanently attached to said first cross-bar between the end of said end portion and the middle of the cross-bar face with which it co-operates.

13. A V-type cross-bar belt, comprising a plurality of spaced cross-bars having oblique ends, and belt material interconnecting said cross-bars, one of said cross-bars having two overlapping end portions of belt material superposed upon it while the next adjacent cross-bar has upon it the continuation of but one of said end portions, said two adjacent cross-bars being so proportioned that their corresponding oblique ends lie in substantially the same plane when the belt is straight, the end portion which overlies said first cross-bar but does not extend to the second cross-bar being interposed between said first cross-bar and the other end portion and being permanently attached to said first cross-bar between the end of said end portion and the middle of the cross-bar face with which it co-operates, said last-named cross-bar face being curved.

14. A V-type cross-bar belt, comprising a plurality of spaced cross-bars having oblique ends, belt material interconnecting said cross-bars, one of said cross-bars having two overlapping end portions of belt material superposed upon it while the next adjacent cross-bar has upon it the continuation of but one of said end portions, said two adjacent cross-bars being so proportioned that their corresponding oblique ends lie in substantially the same plane when the belt is straight, and a clamping plate associated with each cross-bar and between which and the associated cross-bar the strip or strips of belt material at such cross-bar are clamped.

15. A V-type cross-bar belt, comprising a plurality of spaced cross-bars having oblique ends, belt material interconnecting said cross-bars, one of said cross-bars having two overlapping end portions of belt material superposed upon it while the next adjacent cross-bar has upon it the continuation of but one of said end portions, said two adjacent cross-bars being so proportioned that their corresponding oblique ends lie in substantially the same plane when the belt is straight, and a clamping plate associated with each cross-bar and between which and the associated cross-bar the strip or strips of belt material at such cross-bars are clamped, said clamping plates being provided with projecting points for penetrating the belt material against which said clamping plates bear.

16. A V-type cross-bar belt, comprising a plurality of spaced cross-bars having oblique ends, belt material interconnecting said cross-bars, one of said cross-bars having two overlapping end portions of belt material superposed upon it while the next adjacent cross-bar has upon it the continuation of but one of said end portions, said two adjacent cross-bars being so proportioned that their corresponding oblique ends lie in substantially the same plane when the belt is straight, and a clamping plate associated with the cross-bar upon which said two ends portions overlap, said clamping plate and the associated cross-bar lying upon opposite sides of the two thicknesses of belt material at said cross-bar so that said two thicknesses of belt material are clamped between said cross-bar and said clamping plate.

17. A V-type cross-bar belt, comprising a plurality of spaced cross-bars having oblique ends, belt material interconnecting said cross-bars, one of said cross-bars having two overlapping end portions of belt material superposed upon it while the next adjacent cross-bar has upon it the continuation of but one of said end portions, said two adjacent cross-bars being so proportioned that their corresponding oblique ends lie in substantially the same plane when the belt is straight, and a clamping plate associated with the cross-bar upon which said two end portions overlap, said clamping plate and the associated cross-bar lying upon opposite sides of the two thicknesses of belt material at said cross-bar so that said two thicknesses of belt material are clamped between said cross-bar and said clamping plate, said clamping plate being provided with projecting points for penetrating the belt material against which it bears.

18. A V-type cross-bar belt, comprising a plurality of spaced cross-bars having oblique ends, and belt material interconnecting said cross-bars, one of said cross-bars having two overlapping end portions of belt material superposed upon it while the next adjacent cross-bar has upon it the continuation of but one of said end portions, said two adjacent cross-bars being of different lengths on their strip-engaging faces.

In witness whereof, I have hereunto set my hand at Indianapolis, Indiana, this 20th day of May, A. D. one thousand nine hundred and twenty-two.

MILTON O. REEVES.